US 6,698,799 B2

(12) United States Patent
Anderson et al.

(10) Patent No.: US 6,698,799 B2
(45) Date of Patent: Mar. 2, 2004

(54) SPUD ASSEMBLY FOR A FUEL TANK

(75) Inventors: Stephen J. Anderson, Livonia, MI (US); Daniel Paul Cunkle, Jonesville, MI (US); David John Gabbey, Pinckney, MI (US); Larry Marin Vandervoort, Spring Arbor, MI (US)

(73) Assignee: Martinrea Industries, Inc., Dexter, MI (US)

( * ) Notice: Subject to any disclaimer, the term of this patent is extended or adjusted under 35 U.S.C. 154(b) by 0 days.

(21) Appl. No.: 10/318,537

(22) Filed: Dec. 12, 2002

(65) Prior Publication Data

US 2003/0107218 A1 Jun. 12, 2003

Related U.S. Application Data

(63) Continuation-in-part of application No. 10/021,671, filed on Dec. 12, 2001.

(51) Int. Cl.$^7$ ................................................ F16L 35/00
(52) U.S. Cl. ................... 285/139.1; 285/360; 285/207
(58) Field of Search ................ 285/139.1, 140.1, 285/139.2, 141.1, 210, 209, 207, 360

(56) References Cited

U.S. PATENT DOCUMENTS

| | | | |
|---|---|---|---|
| 710,631 A | 10/1902 | Tietz | |
| 744,646 A | 11/1903 | Tietz | |
| 850,410 A | 4/1907 | Weatherhead | |
| 1,849,604 A * | 3/1932 | Weatherhead | 411/352 |
| 2,170,010 A | 8/1939 | Conner | 285/40 |
| 2,618,201 A * | 11/1952 | Brohl | 396/531 |
| 2,828,982 A | 4/1958 | Kennedy | 285/310 |
| 2,986,060 A * | 5/1961 | Lifka | 411/521 |
| 3,366,405 A * | 1/1968 | Severence | 403/197 |
| 3,424,481 A * | 1/1969 | Fulghum | 285/140.1 |
| 3,643,987 A * | 2/1972 | DuPont | 285/205 |
| 3,674,290 A | 7/1972 | McNally | 285/248 |
| 4,518,017 A * | 5/1985 | Hennon et al. | 138/96 R |
| 4,773,280 A * | 9/1988 | Baumgarten | 403/197 |
| 4,922,951 A * | 5/1990 | Webster | 137/321 |
| 5,310,226 A | 5/1994 | Norkey | 285/316 |
| 5,660,206 A | 8/1997 | Neal et al. | 137/592 |
| 5,692,783 A * | 12/1997 | Watanabe et al. | 285/61 |
| 5,826,918 A | 10/1998 | Bowles et al. | 285/24 |
| 5,951,059 A | 9/1999 | Kitamura | 285/24 |
| 5,960,819 A | 10/1999 | Weissinger et al. | 137/315 |
| RE36,630 E | 3/2000 | Davey | 285/39 |
| 6,082,782 A * | 7/2000 | Bartholoma et al. | 285/140.1 |
| 6,189,407 B1 * | 2/2001 | Champ et al. | 74/502.4 |
| 6,415,941 B1 | 7/2002 | Huse | 220/562 |

* cited by examiner

Primary Examiner—Eric K. Nicholson
(74) Attorney, Agent, or Firm—Gifford, Krass, Groh, Sprinkle, Anderson & Citkowski, P.C.

(57) ABSTRACT

A spud assembly for use with a fuel tank having a body defining an interior chamber and having an outer periphery. The spud assembly includes a base attached to the outer periphery of the fuel tank and the base has a throughbore open to both the interior chamber of the tank as well as exteriorly of the tank. An elongated spud having an axial throughbore is movable relative to the base between a connected and an unconnected position. In its connected position, the spud is positioned through the base throughbore so that the spud fluidly connects the interior of the fuel tank to the spud. Additionally, when the spud is moved to its fully connected position, a locking finger on the base engages a lock abutment surface on the spud to secure the spud and base together. In an alternate embodiment, a locking ring is coaxially disposed over the spud and base when the spud is in its connected position. The locking ring is rotatable between an unlocked position in which the spud and base can be disconnected from each other, and a locked position in which the spud and base are secured together.

31 Claims, 5 Drawing Sheets

US 6,698,799 B2

SPUD ASSEMBLY FOR A FUEL TANK

CROSS-REFERENCE TO RELATED APPLICATION

This application is a continuation-in-part of U.S. patent application Ser. No. 10/021,671 filed Dec. 12, 2001.

BACKGROUND OF THE INVENTION

I. Field of the Invention

The present invention relates to a spud assembly for use with a fuel tank.

II. Description of the Prior Art

All automotive vehicles which utilize liquid hydrocarbon fuel, such as gasoline or diesel fuel, include a fuel tank having a body defining an interior chamber in which the fuel is contained as well as an outer periphery. A tubular and cylindrical spud is then connected to the fuel tank so that the spud protrudes outwardly from the outside of the fuel tank and is open to the interior of the fuel tank.

In order to enable refilling of the fuel tank, an elongated filler pipe is connected at one end to the fuel tank spud and, at its other end, is accessible exteriorly of the vehicle for refilling. In order to compensate for any vibration or movement between the fuel tank and the body of the automotive vehicle, the portion of the filler pipe which is connected to the fuel tank spud is made of a resilient material.

In order to connect the filler pipe to the fuel tank spud, it has been previously known to utilize hose clamps of one sort or another which compress the filler pipe around the fuel tank spud. Additionally, the fuel tank spud typically includes a barb to eliminate, or at least greatly reduce the risk of, pull off of the filler pipe from the fuel tank spud.

This previously known method for securing the filler pipe to the fuel tank spud, however, has suffered from a number of disadvantages. One disadvantage is that the attachment of the filler pipe to the fuel tank spud is typically manually performed on the assembly line. As such, the operation of securing the filler pipe to the fuel tank spud is labor intensive and, thus, relatively expensive in assembly cost.

A still further disadvantage of the previously known method of attaching the filler pipe to the fuel tank spud is that, because the filler pipe is manually connected to the fuel tank spud, errors in attachment between the filler pipe and fuel tank spud can and do occur. Any such errors or insufficient securement of the filler tank to the fuel tank spud can result not only in the leakage of fuel from the connection between the filler pipe and the fuel tank spud, but also the escape of hydrocarbon gases. Furthermore, increasingly stringent government regulations greatly restrict the amount of hydrocarbon emissions from the automotive vehicle.

SUMMARY OF THE PRESENT INVENTION

The present invention provides a spud assembly for use with a fuel tank which overcomes all of the above-mentioned disadvantages of the previously known devices.

In brief, the spud assembly of the present invention comprises a base which is attached to the outer periphery of the fuel tank. This base includes a throughbore open to both the interior chamber of the tank and exteriorly of the tank. Preferably, the base includes an outwardly facing mounting surface at its outer or free end.

An elongated tubular and cylindrical spud having an axial throughbore is insertable into the base throughbore from an unconnected and to a connected position. In its connected position, the spud throughbore is open to the interior of the fuel tank. Preferably the spud includes an outwardly extending annular flange which abuts against the base mounting surface to limit the insertion of the spud into the base at its connected position. Additionally, a conventional fluid seal, such as an O-ring, is disposed between the base and the spud to ensure a fluid seal between the base and spud.

The base further includes at least one, and preferably several circumferentially spaced flexible locking fingers. These locking fingers engage a locking abutment surface on the spud when the spud is moved to its connected position thereby locking the spud to the base.

In an alternative embodiment, a locking ring is coaxially disposed over both the spud and the base when the spud is at its connected position. The locking ring includes at least one, and preferably several, circumferentially spaced bayonet couplings which cooperate with locking tabs on the base. The locking ring is thus rotatable between an unlocked position, in which the spud and base are detachable from each other, and a locked position in which the bayonet couplings on the locking ring lockingly engage the locking tabs on the base and lock the spud and base together. With the locking ring in its locked position, the spud flange is sandwiched in between the locking ring and the base.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 3:
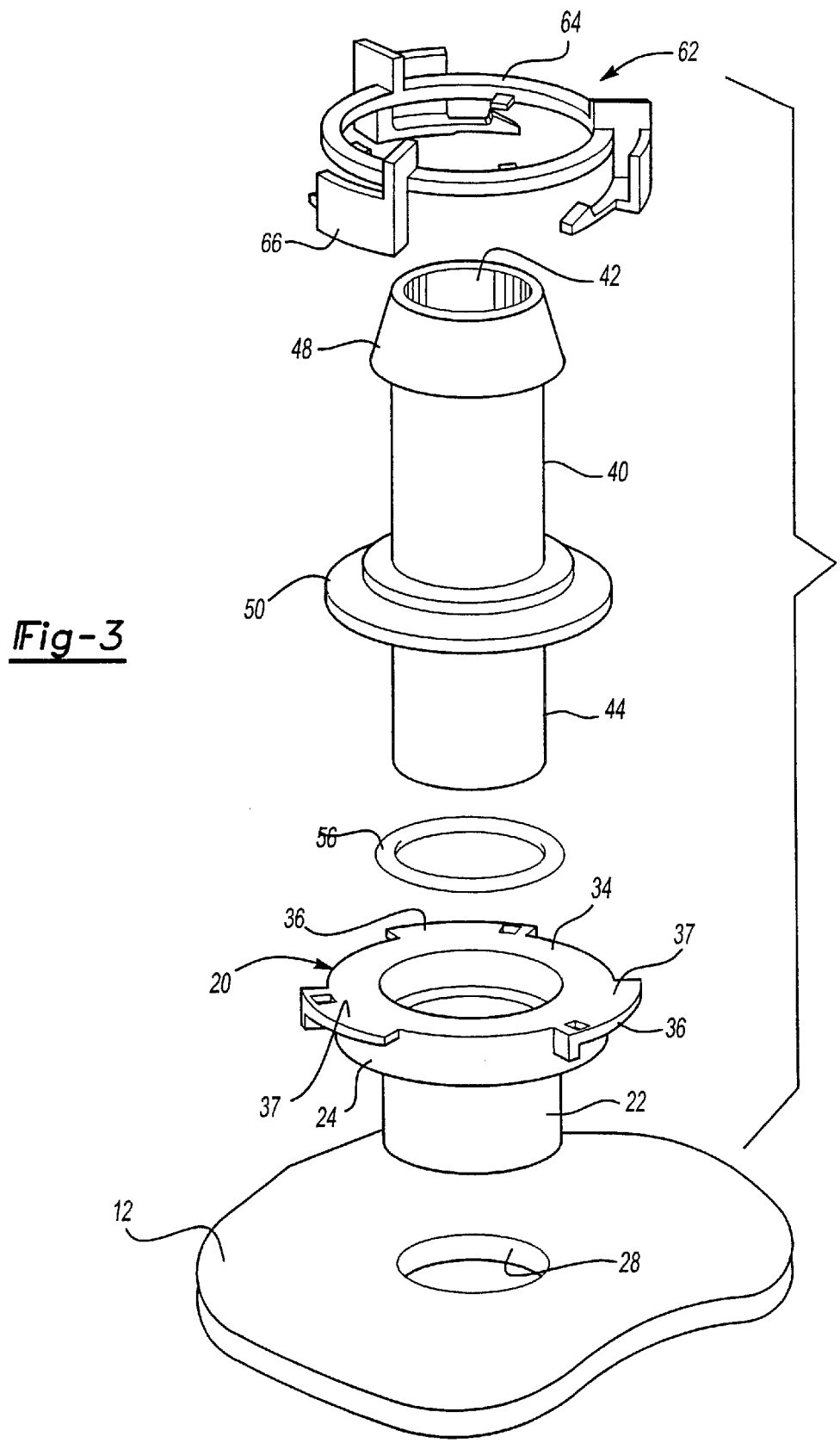
FIG. 3 is an exploded view of the preferred embodiment of the present invention.
Figure 4:
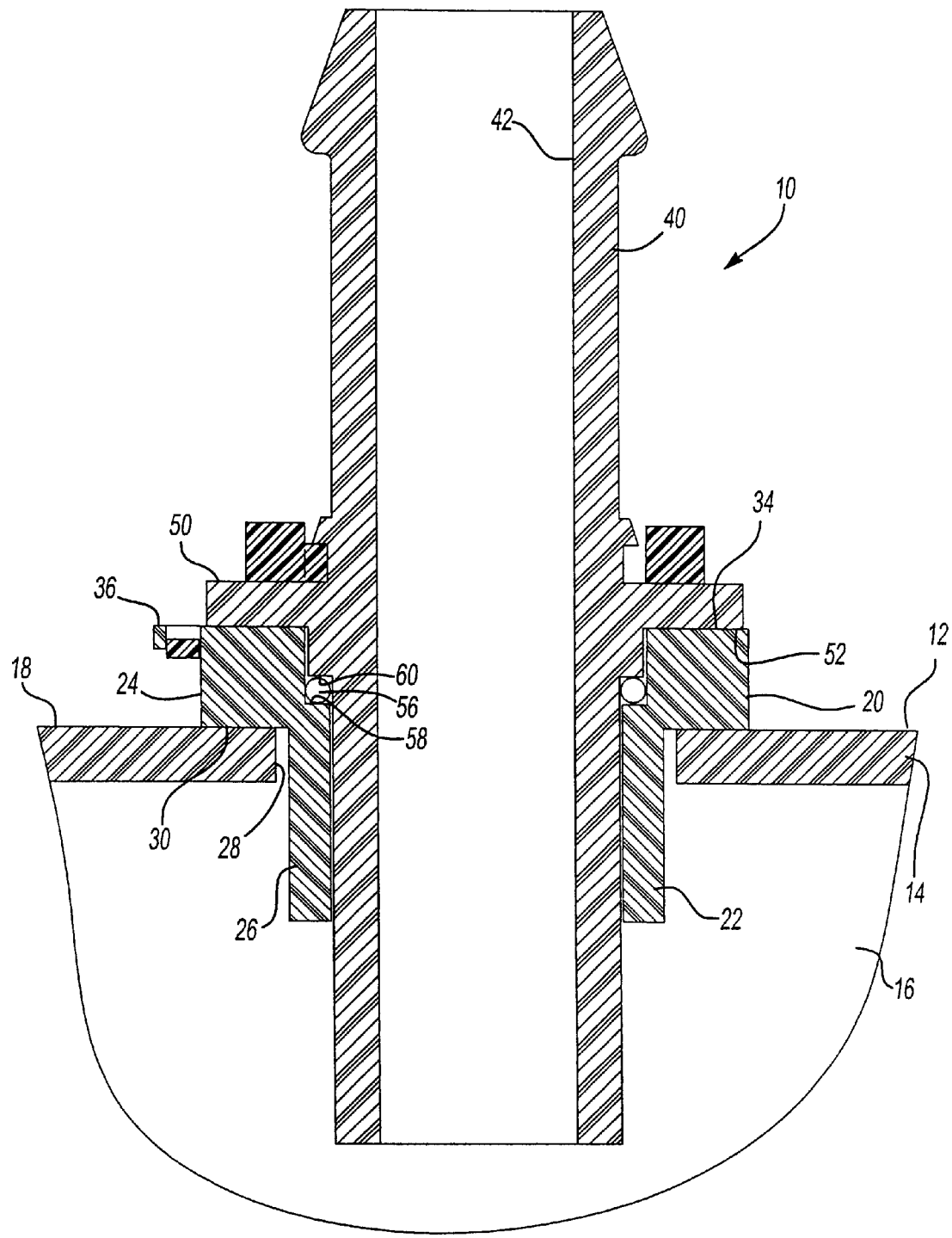
FIG. 4 is a longitudinal sectional view taken substantially along line 4—4 in FIG. 1 and enlarged for clarity.

With reference first to FIGS. 3 and 4, a preferred embodiment of the spud assembly 10 of the present invention is there shown for use with a fuel tank 12. The fuel tank 12 includes a body 14 defining an interior chamber 16 in which fuel is contained. The fuel tank body 14 also defines an outer periphery 18.

The fuel tank spud assembly 10 comprises a tubular and cylindrical base 20 having a reduced diameter portion 22 at one end and an enlarged diameter portion 24 at its other end. An axially extending throughbore 26 is formed through the base 20.

The base 20 is aligned with a throughbore 28 formed through the fuel tank 12. The tank throughbore 28 is dimensioned so that the reduced diameter portion 22 of the base 20 is insertable through the tank throughbore 28 and extends into the interior chamber 16 of the fuel tank 12 as best shown in FIG. 4. In doing so, however, the enlarged diameter portion 24 of the base 20 abuts against the outer periphery 18 of the fuel tank 12. This enlarged diameter portion 24 of the base 20 is then secured to the outer periphery 18 of the fuel tank 12 in any conventional fashion, such as by welds 30 (FIG. 4), an adhesive or any other conventional means. The welds 30, furthermore, form a fluid seal between the base 20 and the fuel tank 12 such that fluid flow through the base 20 can occur only through its throughbore 26.

Figure 5A:
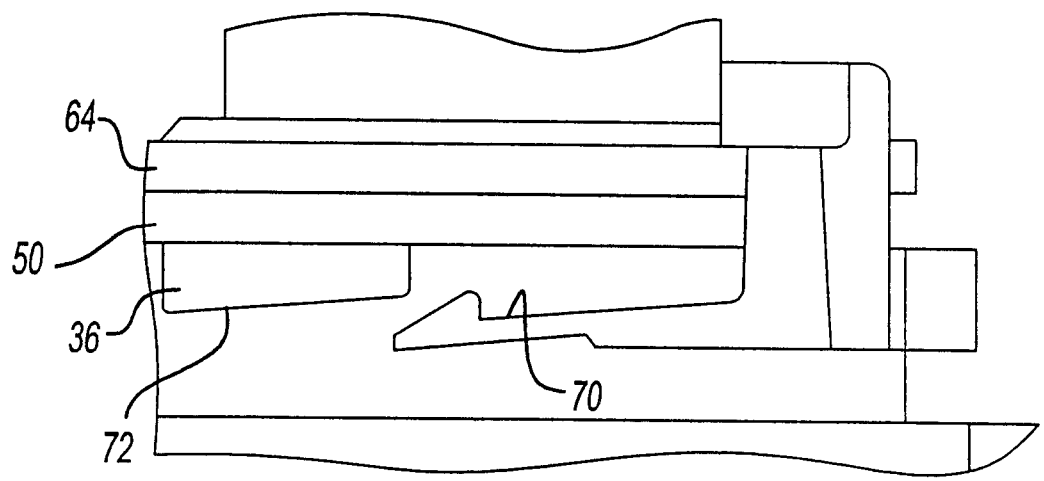
FIG. 5A is a fragmentary side view illustrating the locking ring in an unlocked position.
Figure 5B:
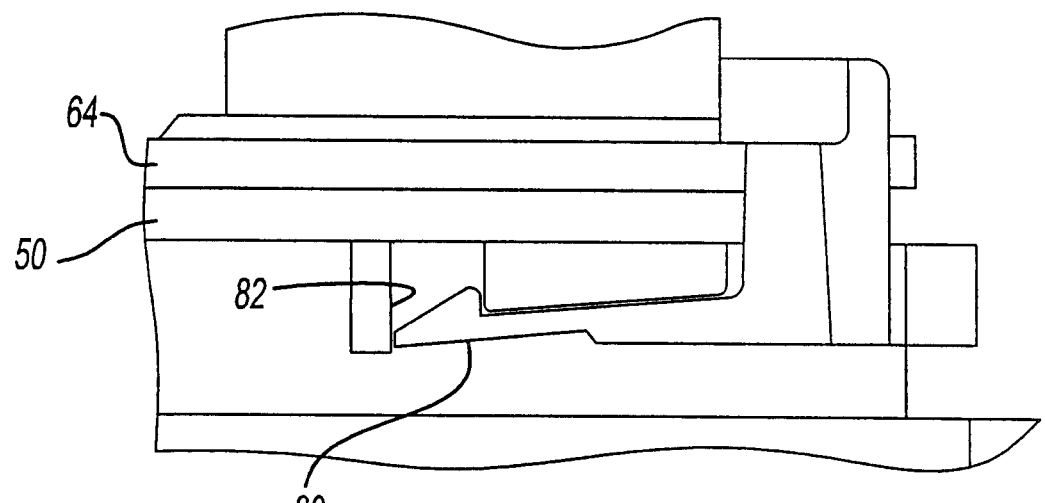
FIG. 5B is a view similar to FIG. 5 but illustrating the locking ring in a locked position.

Still referring to FIGS. 3 and 4, the base 20 defines a generally flat mounting surface 34 at its end facing outwardly from the fuel tank 12. At least one and preferably three circumferentially spaced locking tabs 36 protrude radially outwardly from the enlarged diameter portion 24 of the base 20. As best shown in FIGS. 5A and 5B, each locking tab 36 includes a ramped surface 72 facing the fuel tank 12 for a reason to be subsequently described.

Still referring to FIGS. 3 and 4, the spud assembly 10 further includes an elongated tubular and cylindrical spud 40 having an axial throughbore 42. One end 44 of the spud 40 is dimensioned for insertion through the base throughbore 26 while a barb 48 is provided at the opposite or outer end of the spud 40.

Figure 1:
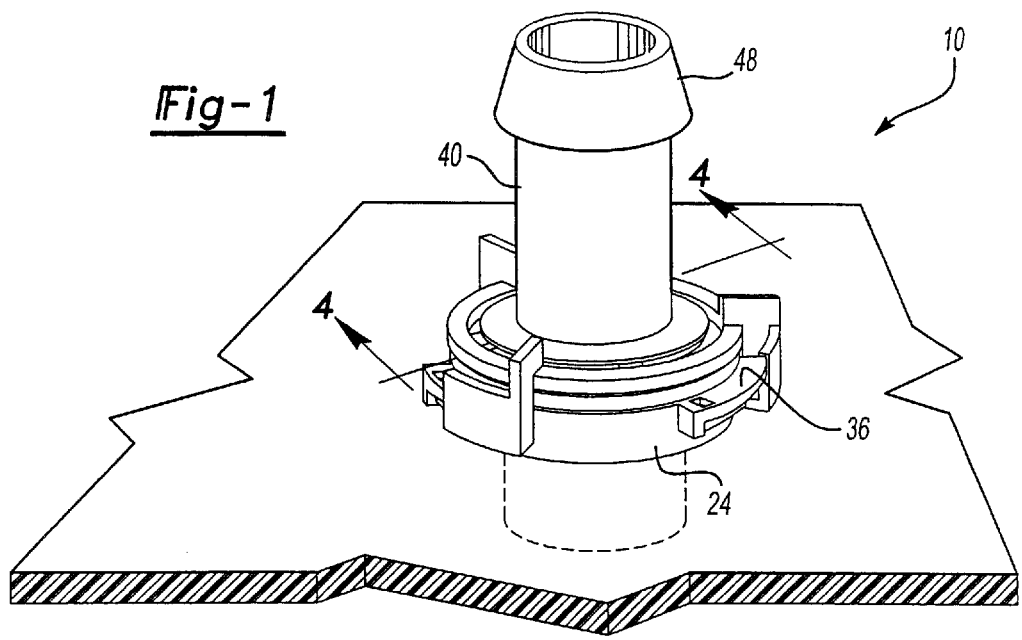
FIG. 1 is a fragmentary elevational view illustrating a preferred embodiment of the spud assembly of the present invention.

An annular flange 50 extends radially outwardly from an intermediate point of the spud 40. This flange 50, furthermore, includes a mounting surface 52 (FIG. 4) which flatly abuts against the base mounting surface 34 when the spud 40 is moved to its connected position as shown in FIGS. 1 and 4. The outside diameter of the flange 50 is equal to or slightly less than the outside diameter of the enlarged diameter portion 24 of the base 12 so that the base locking tabs 36 protrude outwardly from the spud flange 50 as best shown in FIGS. 1 and 4.

With reference now particularly to FIG. 4, a resilient fluid seal 56, such as an O-ring, is disposed within a channel formed between two annular and facing surfaces 58 and 60 formed on the base 20 and spud 40, respectively. When the spud is in its connected position 40, the surfaces 58 and 60 are spaced apart by a distance slightly less than the diameter of the seal 56 thus compressing the seal 56 and fluidly sealing the spud 40 and base 20 together.

Figure 2:
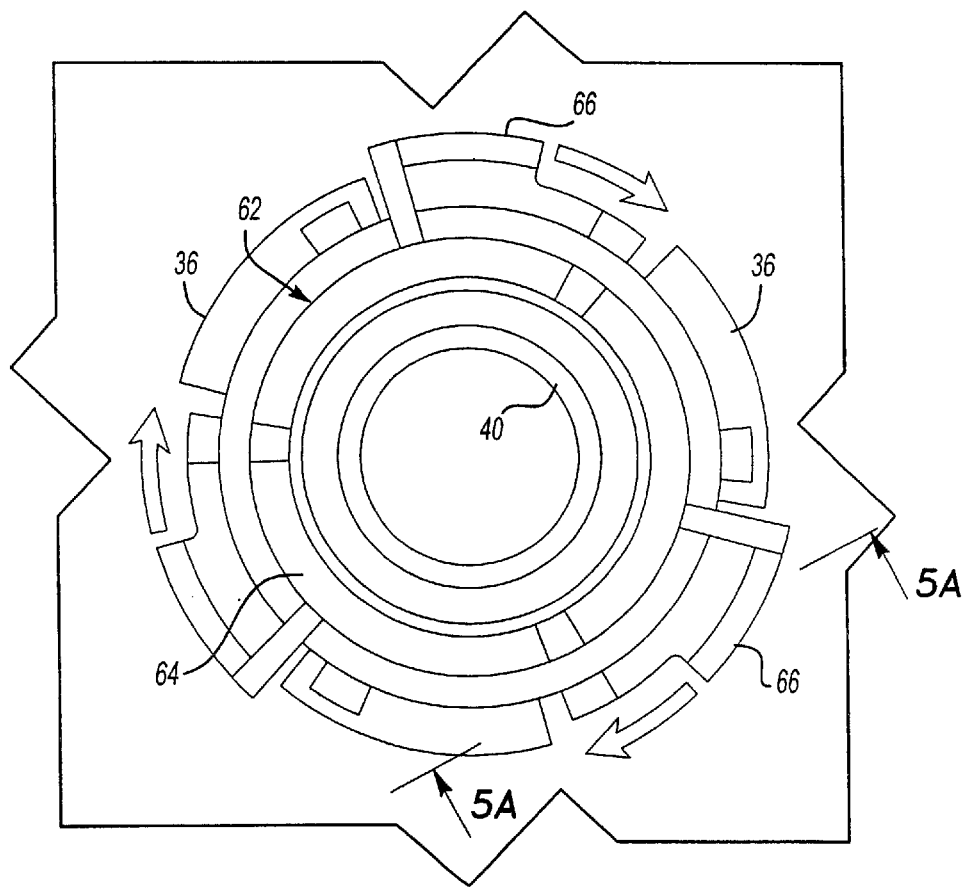
FIG. 2 is a top view of the preferred embodiment of the invention.

With reference now to FIGS. 2 and 3, a locking ring 62 having an annular body 64 is coaxially disposed around both the spud 40 and the base 20 when the spud 40 is in its connected position (FIGS. 1 and 4). At least one, and preferably three, circumferentially spaced couplings 66 are provided around the body 64 of the locking ring such that one coupling 66 is provided for each locking tab 36 on the base 22. Furthermore, as subsequently described in greater detail, the coupling 66 together with the locking tabs 36 form a bayonet coupling assembly for securing the locking ring 62 to the base 20 with the spud flange 50 sandwiched between the locking ring 62 and base 20.

With reference now to FIGS. 2, 5A and 5B, the operation of the locking ring 62 will be described in greater detail. With the spud 40 placed in its connected position on the base 20, the locking ring 62 is first coaxially positioned over the spud 40 in an unlocked position in which the couplings 66 are positioned in between adjacent locking tabs 36 on the base 20 with the locking ring 62. In its unlocked position, the spud 40 can be manually removed from the base 20 if desired.

With reference now particularly to FIGS. 5A and 5B, FIG. 5A illustrates the locking ring 62 in its unlocked position while FIG. 5B illustrates the locking ring 62 in its locked position. Each coupling 66 includes an axially ramped surface 70 which engages the axially ramped surface 72 on the locking tab 36 upon rotation of the locking ring 62 from its unlocked position (FIG. 5A) to its locked position (FIG. 5B). Consequently, as the locking ring 62 is rotated from its unlocked position (FIG. 5A) to its locked position (FIG. 5B), the co-action between the surfaces 70 and 72 compresses the spud flange 50 between the locking ring body 64 and the base locking tabs 36 thus snugly and firmly securing the spud 40 to the base 20.

Still referring to FIGS. 5A and 5B, at least one coupling 64 preferably includes a resilient locking pin 80 which flexes away from the ramp surface 72 on the locking tabs 36 as the locking ring 62 is rotated from its unlocked position and to its locked position. However, when the locking ring 62 is fully rotated to its locked position, the locking pin 80 resiliently enters a lock opening 82 formed in the locking tabs 36 thereby securing the locking ring in its locked position.

Preferably the base 20, spud 40 and locking ring 62 are each of a one piece plastic construction for inexpensive yet durable operation.

A primary advantage of the present invention is that the spud 40, when detached from the base 20, can be secured to a filler pipe prior to attaching the filler pipe to the fuel tank. Consequently, the filler pipe for the automotive vehicle and spud 40 can be secured together at an assembly area independent of the automotive production line for the vehicle. Thereafter, in order to secure the spud 40 to the base 22, it is only necessary to insert the spud 40 into the base 20 and manually rotate the locking ring 62 from its unlocked and to its locked position.

Figure 6:
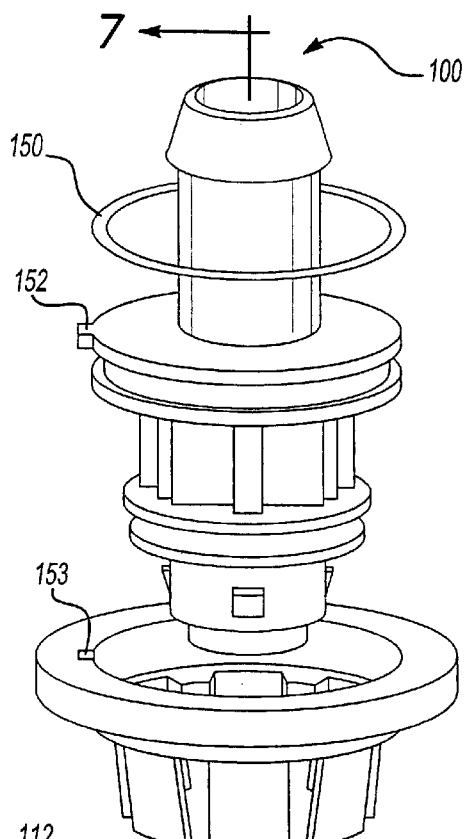
FIG. 6 is an exploded view illustrating a further preferred embodiment of the present invention.
Figure 7:
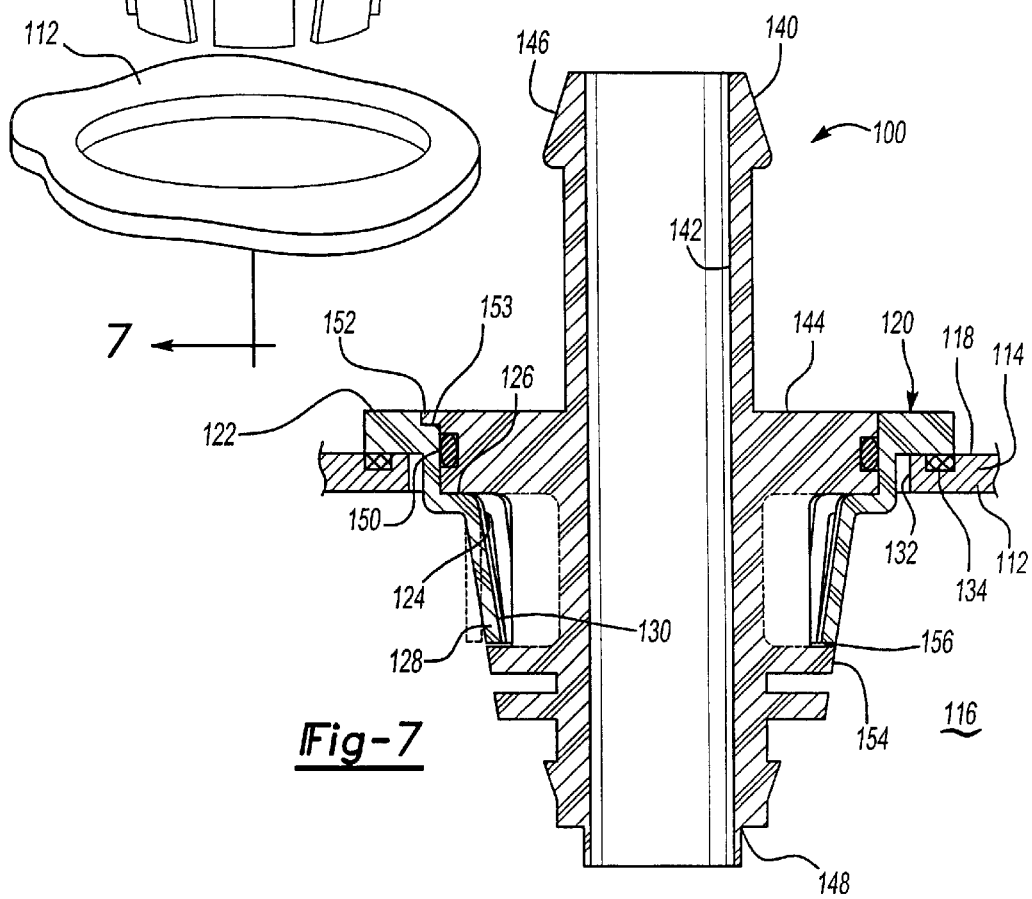
FIG. 7 is a longitudinal sectional view illustrating the second preferred embodiment of the invention.

With reference now to FIGS. 6 and 7, a second preferred embodiment of a spud assembly 100 is shown for use with a fuel tank 112 (only partially illustrated). The fuel tank 112 includes a body 114 defining an interior chamber 116 in which fuel is contained. The fuel tank body 114 also defines an outer peripheral surface 118.

The fuel tank spud assembly 100 comprises a tubular and cylindrical base 120 having an annular enlarged diameter mounting flange 122 and a reduced diameter portion 124. An annular and outwardly facing abutment surface 126 is formed between the mounting flange 122 and reduced diameter portion 124.

Still referring to FIGS. 6 and 7, the base 120 further includes a plurality of circumferentially spaced flexible fingers 128 extending from the reduced diameter portion 124 of the base 120. These fingers 128, furthermore, are positioned around a throughbore 130 formed through the base 120.

Referring now particularly to FIG. 7, the base 120 is positioned within an opening 132 formed in the fuel tank 112 so that the base mounting flange 120 abuts against the outer peripheral surface 118 of the tank 112. The mounting flange 122 is then attached to the fuel tank 112 in any conventional fashion, such as by welds 134. The welds 134, furthermore, form a fluid tight connection between the mounting flange 122 of the base 120 and the fuel tank 112.

Referring again to FIGS. 6 and 7, the spud assembly 100 further comprises an elongated tubular spud 140 having an axial throughbore 142. The spud 140 also includes a radially outwardly extending flange 144 intermediate its outer end 146 and inner end 148.

The spud 140 is movable between an unconnected position, illustrated in FIG. 6, and a connected position, illustrated in FIG. 7. In its connected position (FIG. 7) the inner end 148 of the spud 140 is inserted through the throughbore 130 on the base 120 until the spud mounting flange 144 abuts against the abutment surface 126 formed on the base 120. An O-ring 150 carried by the spud mounting flange 144 ensures a fluid tight fit between the spud 140 and the base 120. Furthermore, a position tab 152 on the spud 140 nests within a position recess 153 on the base mounting flange 122 when the spud 140 is moved to its connected position to lock the spud 140 against rotation relative to the base 120.

The spud 140 further includes at least one outwardly extending lock flange 154 at a position longitudinally spaced from its mounting flange 140. This lock flange 154 has an outer diameter greater than the smallest inside diameter of the base flexible fingers 128 when the fingers 128 are in a free, i.e. unflexed, state. Consequently, upon insertion of the spud 140 through the base throughbore 130, the lock flange 154 on the spud 140 deflects the locking fingers 128 outwardly as shown in phantom line in FIG. 7 thus enabling the spud 140 to be moved to its connected position (FIG. 7). However, once the spud 140 reaches its connected position, the free ends of the locking fingers 128 are positioned above the lock flange 154 and flex radially inwardly toward their original free position so that the free ends of the locking fingers 128 are positioned above an upper surface 156 of the lock flange 154. Consequently, upon insertion of the spud 140 to its connected position, the locking fingers 128 engage the locking flange 154 and prevent retraction of the spud 140 from the base 120.

The spud 140 is preferably of a one-piece plastic construction, except for the sealing ring 150, and, likewise, the base 120 is of a one-piece plastic construction. As such, both the spud 140 and base 120 may be inexpensively manufactured. Furthermore, since the spud 140 is assembled to the base 120 by simply pushing the end 148 of the spud 140 through the base opening, the final assembly of the spud assembly 100 may be rapidly accomplished.

Additionally, the spud 40 or 140 and base 20 or 120 may be made of different materials. For example, the base is preferably made of high-density polyethylene for compatibility with fuel tanks made of high-density polyethylene. High-density polyethylene, however, has not proven highly effective with hose clamp connections necessary for the spud 40 or 140. Consequently, the spud 40 or 140 is preferably made of a high-molecular polymer, such as glass filled nylon, which is highly effective for hose clamp connections due to its stiffness. Such a high-molecular polymer can also be made electrically conductive by the use of additives. Such conductive additives cannot be used with high-density polyethylene since it interferes with the weld to the gas tank.

Having described my invention, however, many modifications thereto will become apparent to those skilled in the art to which it pertains without deviation from the spirit of the invention as defined by the scope of the appended claims.

We claim:

1. A spud assembly for use with a fuel tank having a body defining an interior chamber and having an outer periphery, said spud assembly comprising:

a base attached to the outer periphery of the fuel tank, said base having a throughbore open both to the interior chamber of the tank and exteriorly of the tank, an elongated spud having an axial throughbore, said spud being positioned onto said base to a connected position in which said spud extends axially through at least a portion of said base throughbore, throughbore and said base throughbore are fluidly connected together in series with each other, a locking ring coaxially disposed over said spud and said base when said spud is in said connected position, said locking ring having means for locking said base and said spud together with said spud in said connected position as said ring is rotated from an unlocked position to a locked position, wherein said base has an outwardly facing mounting surface coaxially disposed around said base throughbore, said spud having a radially outwardly extending flange forming an annular mounting surface, said spud and said base mounting surfaces abutting against each other when said spud is in said connected position.

2. The invention as defined in claim 1 wherein said base has an outwardly facing mounting surface coaxially disposed around said base throughbore, said spud having a radially outwardly extending flange forming an annular mounting surface, said spud and said base mounting surfaces abutting against each other when said spud is in said connected position.

3. The invention as defined in claim 1 wherein said ring compresses said mounting surfaces together as said ring is rotated to said locked position.

4. The invention as defined in claim 1 wherein said locking means comprises a bayonet coupling between said locking ring and said base, said flange being sandwiched between said ring and said base mounting surface.

5. The invention as defined in claim 4 wherein said bayonet coupling comprises at least two circumferentially spaced and outwardly extending tabs secured to said base and at least two circumferentially spaced locking channel members secured to said locking ring, each of said channel members dimensioned to receive one of said locking tabs as said locking ring is rotated from said unlocked to said locked position.

6. The invention as defined in claim 5 wherein each locking tab comprises a ramped surface, said channel member having a wall which slidingly engages said ramped surface as said locking ring is rotated from said unlocked position to said locked position.

7. The invention as defined in claim 5 wherein at least one of said locking tabs includes an opening, said channel member having a lock pin which registers with said locking tab opening only when said locking ring is in said locked position.

8. The invention as defined in claim 7 wherein said lock pin is resiliently mounted to said channel member.

9. The invention as defined in claim 7 wherein said locking ring, said channel members and said lock pin are of a one-piece plastic construction.

10. The invention as defined in claim 1 and comprising a resilient seal disposed between said base and said fuel spud.

11. The invention as defined in claim 1 wherein said fuel spud and said flange are of a one-piece plastic construction.

12. The invention as defined in claim 1 wherein said base is welded to the outer periphery of the fuel tank.

13. A spud assembly for use with a fuel tank having a body defining an interior chamber and having an outer periphery, said spud assembly comprising:

a base attached to the outer periphery of the fuel tank, said base having a throughbore open both to the interior chamber of the tank and exteriorly of the tank, an elongated spud having an axial throughbore, said spud being insertable through said base throughbore from an unconnected position to a connected position, means integrally formed with said base for automatically locking said spud to said base when said spud is moved to said connected position, wherein said base has an outwardly facing mounting surface coaxially disposed around said base throughbore, said spud having a radially outwardly extending mounting flange forming an annular mounting surface, said spud and said base mounting surfaces abutting against each other when said spud is in said connected position, a resilient seal disposed around said spud mounting flange and sealingly engaging said base when said spud is moved to said connected position, and wherein said base composes an axially extending surface coaxially extending around said base abutment surface, and wherein said seal is sandwiched between said spud mounting flange and said base axially extending surface when said spud is moved to said connected position.

14. The invention as defined in claim 13 wherein said means comprises at least one resilient finger mounted to said base, said spud engaging and outwardly deflecting said at least one finger as said spud is moved from said unconnected to said connected position, said at least one finger returning towards its undeflected position when said spud reaches said connected position to thereby engage a lock abutment surface on said spud and lock said spud to said base.

15. The invention as defined in claim 14 wherein said at least one finger comprises a plurality of circumferentially spaced fingers.

16. The invention as defined in claim 15 wherein said spud comprises a radially outwardly lock flange, an outwardly facing surface of said lock flange forming said lock abutment surface.

17. The invention as defined in claim 15 wherein said base and said fingers are of a one-piece construction.

18. The invention as defined in claim 17 wherein said base is made of plastic.

19. The invention as defined in claim 13 wherein said mounting flange and said spud are of a one-piece construction.

20. The invention as defined in claim 13 wherein said spud and said flange are each of a one-piece plastic construction.

21. The invention as defined in claim 13 wherein said base is welded to the outer periphery of the fuel tank.

22. The invention as defined in claim 13 and comprising an outwardly extending locating tab formed on said spud, said locating tab being received within a recess formed on said base when said spud is moved to said connected position.

23. A spud assembly for use with a fuel tank having a body defining an interior chamber and having an outer periphery, said spud assembly comprising:

a base attached to the outer periphery of the fuel tank, said base having a throughbore open both to the interior chamber of the tank and exteriorly of the tank, an elongated spud having an axial throughbore, said spud being insertable through said base throughbore from an unconnected position to a connected position, means integrally formed with said base for automatically locking said spud to said base when said spud is moved to said connected position, wherein said fuel spud and said flange are each of a one-piece plastic construction.

24. The invention as defined in claim 23 wherein said means comprises at least one resilient finger mounted to said base, said spud engaging and outwardly deflecting said at least one finger as said spud is moved from said unconnected to said connected position, said at least one finger returning towards its undeflected position when said spud reaches said connected position to thereby engage a lock abutment surface on said spud and lock said spud to said base.

25. The invention as defined in claim 24 wherein said at least one finger comprises a plurality of circumferentially spaced fingers.

26. The invention as defined in claim 25 wherein said spud comprises a radially outwardly lock flange, an outwardly facing surface of said lock flange forming said lock abutment surface.

27. The invention as defined in claim 25 wherein said base and said fingers are of a one-piece construction.

28. The invention as defined in claim 27 wherein said base is made of plastic.

29. The invention as defined in claim 23 wherein said mounting flange and said spud are of a one-piece construction.

30. The invention as defined in claim 23 wherein said spud and said flange are each of a one-piece plastic construction.

31. The invention as defined in claim 23 and comprising an outwardly extending locating tab formed on said spud, said locating tab being received within a recess formed on said base when said spud is moved to said connected position.

* * * * *